US006438652B1

(12) United States Patent
Jordan et al.

(10) Patent No.: US 6,438,652 B1
(45) Date of Patent: *Aug. 20, 2002

(54) LOAD BALANCING COOPERATING CACHE SERVERS BY SHIFTING FORWARDED REQUEST

(75) Inventors: Kevin Michael Jordan, Briarcliff Manor; Kun-Lung Wu, Yorktown Heights; Philip Shi-Lung Yu, Chappaqua, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,223

(22) Filed: Oct. 9, 1998

(51) Int. Cl.[7] ............................................... G06F 12/06
(52) U.S. Cl. ....................... 711/120; 709/105; 709/223; 709/219; 711/154
(58) Field of Search ................................ 711/118, 120, 711/124, 144, 147, 154; 709/219, 223, 225, 226, 203, 200, 201, 202

(56) References Cited

U.S. PATENT DOCUMENTS

| | | | | |
|---|---|---|---|---|
| 5,787,470 A | * | 7/1998 | DeSimone et al. | 711/124 |
| 5,933,849 A | * | 8/1999 | Srbljic et al. | 711/118 |
| 5,935,207 A | * | 8/1999 | Logue et al. | 709/219 |
| 6,026,474 A | * | 2/2000 | Carter et al. | 711/202 |
| 6,070,191 A | * | 5/2000 | Narendran et al. | 709/226 |
| 6,078,960 A | * | 6/2000 | Ballard | 709/229 |
| 6,112,279 A | * | 8/2000 | Wang | 711/119 |
| 6,122,666 A | * | 9/2000 | Beurket et al. | 709/226 |
| 6,141,759 A | * | 10/2000 | Braddy | 709/203 |
| 6,167,427 A | * | 12/2000 | Rabinovich et al. | 709/201 |
| 6,167,438 A | * | 12/2000 | Yates et al. | 709/216 |
| 6,173,311 B1 | * | 1/2001 | Hassett et al. | 709/202 |
| 6,185,601 B1 | * | 2/2001 | Wolff | 709/203 |
| 6,253,230 B1 | * | 6/2001 | Couland et al. | 709/203 |

OTHER PUBLICATIONS

Alanyali, M., "On simple algorithms for dynamic load balancing", Annual Joint Conference of the IEEE Computer and Communications Societies, pp. 230–238, vol. 1, Apr. 1995.*

Das, S. "A Distributed Load Balancing Algorithm For The Hot Cell Problem in Cellular Mobile Networks", IEEE Symposium on High Performance Distributed Computing, pp 254–263, Aug. 1997.*

M. D. Dahlin et al., "Cooperative Caching: Using Remote Client Memory to Improve File System Performance", University of California at Berkeley, 14 pages (1994.

Vinod Valloppillil et al., "Cache Array Routing Protocol v1.0", Internet–Draft, <draft–vinod–carp–v1–03.txt>, Feb. 26, 1998, 7 pages.

(List continued on next page.)

*Primary Examiner*—Matthew Kim
*Assistant Examiner*—Pierre-Michel Bataille
(74) *Attorney, Agent, or Firm*—Gail H. Zarick; Anne Vachon Dougherty

(57) ABSTRACT

In a system including a collection of cooperating cache servers, such as proxy cache servers, a request can be forwarded to a cooperating cache server if the requested object cannot be found locally. An overload condition is detected if for example, due to reference skew, some objects are in high demand by all the clients and the cache servers that contain those hot objects become overloaded due to forwarded requests. In response, the load is balanced by shifting some or all of the forwarded requests from an overloaded cache server to a less loaded one. Both centralized and distributed load balancing environments are described.

97 Claims, 5 Drawing Sheets

OTHER PUBLICATIONS

S. Gadde et al., "Directory Structures for Scalable Internet Caches", Department of Computer Science, Duke University, Durham, NC 27708–0129, Nov. 1997, 14 pages and introductory page.

Guerney D. H. Hunt et al., "Network Dispatcher: a connection router for scalable Internet services", Computer Networks and ISDN Systems 30 (1998), pp. 347–357.

"1. The WebCaching Solution, 2. Netra Proxy Cache Server Features and 3. Scenarios", http://sun.com/products–solutions/hw/networking/whitepapers/proxywp.shtml, Copyright ©1997, Sun Mycrosystems, 11 pages with 1 sheet of drawing, http://www.sun.com/products–n–solutions/hw/networking/images/pxycacha.gif.

"Squid Internet Object Cache", http://squid.nlanr.net/, 2 pages.

"WebWave: globally load balanced fully distributed caching of hot published documents", A. Heddaya, et al, International Conference on Distributed Computing Systems, 1997, pp. 160–168.

"Performance study of a collaborative method for hierarchical caching in proxy servers", P.S. Yu, et al, Computer Networks and ISDN Systems, NL North Holland Publishing, Amsterdam, vol. 30, No. 1–7, Apr. 14, 1998, pp. 215–224.

"A scalable and distributed WWW proxy system"., K.L.E. Law, et al, Proceedings IEEE International Conference on Multimedia Computing and Systems, Ottawa, Canada, Jun. 3–6, 1997, pp. 565–571.

"Scalable Web server Architectures", A. Mourad, et al, Proceedings IEEE Symposium on Computers and Communications, 1997, pp. 12–16.

"Load balancing and Hot Spot Relief for Hash Routing Among a Collection of Proxy Caches", Wu et al., IEEE Transactions on Computers.*

Yang et al., "Collaborative Web Caching Based on Proxy Affinities", ACM SIGMETRICS Performance Evaluation Review, Proceedings of the International Conference on Measurments and Modeling of Computer Systems, vol. 28, pp. 78–89, Jun. 2000.*

Das et al., "A Dynamic Load Balancing Strategy for Channel Assignment Using Selective Borrowing in Cellular Mobile Environment", Selective Papers from MobiCom, Mobile Computing and Networking, pp. 333–347, 1997.*

Voelker et al., "Managing Server Load in Global Memory Systems", ACM SIGMETRICS Performance Evaluation Review, Proceedings of the 1997 ACM SIGMETRICS International Conference on Measurement and Modeling of Computer Systems, vol. 25, pp. 127–138, Jun. 1.*

Asaka, T. et al., "Distributed Web Caching Using Hash–Based Query Caching Method", IEEE International Conference on Control Applications, pp. 1620–1625, 1999.*

Kun–Lung Wu et al., "Load balancing and Hot Spot Relief for Hash Routing Among a Collection of Proxy Caches", IEEE International Conference on Distributed Computing Systems, pp. 536–543, 1999.*

Colajanni, M. et al., "Dynamic Load Balancing in Geographically Distributed Heterogeneous Web Servers", International Conference on Distributed Computing Systems, pp. 295–302, 1999.*

Kawai, E. et al., An Analysis of the Number of ICP Packets on the Distributed WWW Caching System, International Workshops on Parallel Processing, pp. 234–239, 1999.*

Inohara, S. et al., "Self–Organizing Cooperative WWW Caching", International Conference on Distributed Computing Systems, pp. 74–83, 1998.*

Cho–Yu Chiang, et al., "On Request Forwarding for Dynamic Web Caching Hierarchies", International Conference on Distributed Computing Systems, pp. 262–269, 2000.*

Heddaya et al: "WebWave: globally load balanced fully distributed caching of hot published documents" International Conference on Distributed Computing Systems, xx,xx, 1997, pp. 160–168.

Yu et al: "Performance study of a collaborative method for hierarchical caching in proxy serves" Computer Networks and ISDN systems, NL, North Holland Publishing Amsterdam, vol. 30, No. 1–7, Apr. 14, 1998, p. 215–224.

Law et al: "A scalable and distributed WWW proxy system" Proceedings IEEE International Conference on Multimedia Computing and Systems '97 (Cat. No. 97TB100141), Proceedings of IEEE International Conference on Multimedia Computing and systems, Ottawa, Ont., Canada, Jun. 3–6, 1997, pp. 565–571.

Mourad et al: "Scalable Web Server Architectures": Proceedings IEEE Symposium on Computers and Communications, 1997, XP000199852, p. 15.

* cited by examiner

Caching Table — 1011

| Object id/ partition id | Time stamp | Forwarding frequency (count or rate) | Ownership |
|---|---|---|---|
| p | hh:mm | 25,2 | B,A |
| q | hh:mm | 2 | A |
| r | hh:mm | 10,50 | C,A |

Fig. 2a

Load Table — 1021

| Cache server | Load condition |
|---|---|
| A | 0.15 |
| B | 0.45 |
| C | 0.80 |

Fig. 2b

LOAD BALANCING COOPERATING CACHE SERVERS BY SHIFTING FORWARDED REQUEST

FIELD OF THE INVENTION

The present invention is related to load balancing among cooperating cache servers and in particular to load balancing based on load conditions and a frequency that requests are forwarded from cooperating cache servers.

BACKGROUND

The growth in the usage of the World Wide Web has been increasing exponentially. As a result, response times for accessing web objects can become unsatisfactorily slow. One approach to improving web access time is to employ one or more proxy cache servers between browsers and the originating web servers. Examples of proxy cache servers include a cluster of PC servers running Microsoft's Windows $NT_{TM}$, such as the $NETFINITY_{TM}$ servers from IBM; and workstation servers running IBM's $AIX_{TM}$ operating system, such as the IBM $RS/6000_{TM}$ or $SP/2_{TM}$. In fact, more and more organizations, such as Internet Service Providers (ISPS) and corporations, are using a collection of cooperating proxy cache servers to help improve response time as well as reduce traffic to the Internet. A collection of cooperating cache servers have distinct advantages over a single cache server in terms of reliability and performance. If one fails, requests can still be serviced by other cooperating cache servers. Requests can be distributed among the servers, thus increasing scalability. Finally, the aggregate cache size is much larger so that it is more likely that a requested object will be found in one of the cache servers.

With cooperating cache servers, a request that cannot be serviced locally due to a cache miss can be forwarded to another cache server storing the requested object. As a result, there are two kinds of requests that can come to a cache server: direct requests and forwarded requests. Direct requests are those that are received directly from clients. Forwarded requests are those that come from other cooperating cache servers on behalf of their clients due to cache misses on the cache servers. With requests forwarded among the cache servers, a cache server can easily become overloaded if it happens to contain in-demand (or "hot") objects that most clients are currently interested in, creating uneven workloads among the cache servers. Uneven workloads can create a performance bottleneck, as many of the cache servers are waiting for the same overloaded cache server to respond to requests forwarded to it. Therefore, there is a need for a way to perform dynamic load balancing among a collection of proxy cache servers. The present invention addresses such a need.

Load balancing is traditionally done by a front-end scheduler which "evenly distributes" incoming direct requests among the cache servers. For example, load balancing can be done at the DNS level by manipulating a mapping table, such as is done by the $NETRA_{TM}$ proxy cache by Sun Microsystems ("Proxy Cache Server, Product Overview", white paper, Sun Microsystems, http://www.sun.com/). Load balancing among a cluster of servers can also be done with a front-end router, such as the $NETDISPATCHER_{TM}$ offered by IBM (see e.g., G. Goldszmidt and G. Hunt, "NetDispatcher: A TCP Connection Router," IBM Research Report, RC 20853, May 1997). Here, incoming requests are distributed by the $NETDISPATCHER_{TM}$ to the least loaded server in the cluster. However, these traditional approaches distribute only "direct requests" and do not address a load imbalance problem resulting from too many requests for hot objects being simultaneously forwarded to the same proxy server. The present invention addresses such a need.

Cooperative caching, or remote caching, has been used in distributed file systems to improve system performance (see "Cooperative caching: Using Remote Client Memory to Improve File System Performance," by M. D. Dahlin et al., *Proc. of 1st Symp. on Operating Systems Design and Implementation*, pp. 1–14, 1994). Here, the file caches of a collection of workstations distributed on a LAN are coordinated to form a more effective overall file cache. Each workstation caches not only objects referenced by local requests but also objects that may be referenced by requests from a remote workstation. Upon a local cache miss, a local request can be sent to other client workstations where a copy can be obtained, if found. Otherwise, the object is obtained from the object server. The emphasis here is mainly how to maintain cache coherency in the face of updates and how to maintain cache hit ratios by moving a locally replaced object to the cache memory of another workstation. There is no dynamic load balancing.

Cooperative caching is also used in collective proxy cache servers to reduce the access time. Upon a cache miss, instead of going directly to the originating web server potentially through a WAN, a cache server may forward the request to obtain the object from a cooperating cache server in a LAN or a regional area network. For example, upon a local cache miss in the SQUID system, a cache server multicasts a request (using the Internet Cache Protocol (ICP)) to a set of other cache servers (see "Squid Internet Object Cache", by D. Wessels et al., http://squid.nlanr.net/). If their caches contain the requested object, these cooperating cache servers reply with a message indicating such. The requested object is then obtained from the cooperating cache server which responded first to the request, instead of from the original web server on the Internet. However, if none replies after a time-out period, then the requested object will be fetched from the originating web server. Load imbalances can occur at a cache server due to forwarded requests.

Instead of multicasting, the CRISP system uses a logical central directory to locate an object cached on another proxy server (see "Directory Structures for Scaleable Internet Caches",S. Gadde et al., Technical Report CS-1997-18, Dept. of Computer Science, Duke University, 1997). Here, upon a cache miss, a cache server asks the directory server for the object. With central knowledge of the caches object storage, the directory server sends such a request to the server whose cache includes the object. If found, the object is then sent to the requesting server while the original server continues to cache the object. If no cache has a copy of the requested object, the requesting server obtains the object from the originating web server through the Internet (potentially through a WAN). Again, this can create a load imbalance at the cache server due to subsequent requests forwarded to this cache server.

Yet another way to locate an object on a cooperating cache server is through a hash function. An example is the Cache Array Routing Protocol (CARP) (see V. Valloppillil and K. W. Ross, "Cache Array Routing Protocol v1.0," Internet Draft, http://ircache.nlanr.net/Cache/ICP/draft-vinod-carp-v1-03.txt, February 1998). In CARP, the entire object space is partitioned among the cooperating cache servers, with one partition for each cache server. When a request is received by a cache server from a configured client browser, a hash function is applied to a key from the request, such as the URL or the destination IP address, to identify the partition. If the hash partition is the assigned to requesting cache server, then the request is serviced locally. Otherwise, it is forwarded to the proper cache server in the identified partition.

SQUID, CRISP and CARP use the caches of other proxy servers to reduce the possibility of having to go through the WAN for a missed object. They differ in the mechanism for locating a cooperating cache server whose cache may contain a copy of the requested object. Each cache server services two kinds of requests: direct requests and forwarded requests. Direct requests are those made directly from the browsers connected to the proxy server. Forwarded requests are those made by cooperating cache servers whose caches do not have the requested objects. In any event, depending on the types of objects a proxy server caches at a given moment, its CPU could be overloaded because it is busy serving both direct and forwarded requests.

SUMMARY OF THE INVENTION

In accordance with the aforementioned needs, the present invention is directed to a method and system for balancing the load across a collection of cache servers that process both direct and forwarded requests by shifting some or all forwarded requests to a less loaded cache server.

For example, in a system including a collection of cooperating proxy cache servers, a request can be forwarded to another cooperating server if the requested object cannot be found locally. Instead of fetching the object from the originating web server through the Internet, a cache server can obtain a copy from a cooperating cache server in a local area network or an intranet. The average response time for access to an object can be significantly improved by the cooperating cache server. However, due to reference skew, some objects can be in high demand by all the clients. As a result, the proxy cache servers that contain those hot objects can become overloaded by forwarded requests coming from other proxy cache servers, creating a performance bottleneck. According to the present invention, we propose a load balancing method for a collection of cooperating proxy cache servers by shifting some or all of the forwarded requests from an overloaded cache server to a less loaded one.

An example of a cache server load balancing method in accordance with the present invention includes the steps of: receiving forwarded requests from a cooperating cache server in response to a cache miss for an object on the cooperating cache server; and shifting one or more of the forwarded requests for the object between cooperating cache servers based on a load condition and a forwarding frequency for the object.

The present invention also includes features for periodically monitoring the load condition on and the forwarding frequency to the owning cache server; and proactively shifting one or more subsequent forwarded requests for the cached object from the owning cache server to one or more of the cooperating cache servers, in response to the monitoring. Alternatively, the shifting step further includes the step of checking the load condition and forwarding frequency, in response to the receipt of a forwarded request. In one example, the load condition of the cooperating cache server is a weighted sum of a count of said forwarded requests, and a count of direct requests to said cooperating cache server. In another example, the cache information is maintained at: each object level; or a partition of objects level.

The present invention also includes various implementations for performing the load balancing, including both centralized and distributed environments and various hybrids thereof. For example, a distributed load monitor can be used for monitoring and maintaining a local load condition, the forwarding frequency and ownership information for cached objects on each cooperating cache server. The cooperating cache servers can periodically exchange and maintain one or more of: the load condition information; the forwarding frequency; and the ownership information. For example, the cooperating cache servers can exchange information by piggybacking one or more of: the load condition information; the forwarding frequency; and the ownership information, with one or more of the forwarded requests and responses.

In another example, an overloaded cooperating cache server can identify a less loaded cooperating cache server; and communicate a shift request and a copy of the cached object to the less loaded cooperating cache server (which then caches the object), so that subsequent requests for the object will not be forwarded. Alternatively, an overloaded cooperating cache server can communicate the shift request to the less loaded cooperating cache server, which then obtains a copy of the object from an originating object server, in response to the shift request. In yet another alternative, the owning cache server can multicast the shift request message to one or more of the other cooperating cache servers so that subsequent forward requests will be shifted.

In a fully distributed implementation of the present invention, the cooperating cache servers can each include a distributed load monitor for monitoring and locally maintaining load conditions, and also can maintain the forwarding frequency and ownership information in a local copy of a caching table or by means of a hashing function. The cooperating cache servers can modify the ownership information by means of the local copy of the caching table or the hash function.

The present invention includes still other features for modifying the ownership for the object to a shared ownership between at least two of the cooperating cache servers and forwarding subsequent object requests to one or more less loaded shared owners of the object. If a decrease in the load condition for a shared object is detected, the shared ownership can be merged, in response to the decrease in the load condition.

In yet another example, the shifting of one or more of the forwarded requests based on the load conditon an the forwarding frequency can be accomplished by communicating a copy of the object from the owning cache server to one or more of the cooperating cache servers, so that subsequent requests will not be forwarded (as long as the object remains in the recipient's cache).

An example of a centralized environment in accordance with the present invention includes: a centralized logical load monitor for maintaining the forwarding frequency and the load condition for the cooperating cache servers. The load monitor can include a logical directory server for maintaining a load table for monitoring the load on the cache servers and a caching table (or hash function) for monitoring the forwarding frequency and locating objects. The directory server receives requests for object locations in other cache servers for a locally missed object and forwards requests for locally missed objects. The directory server load balances requests among the cooperating cache servers by manipulating the caching table based on the load and the forwarding frequency for a given object, in response to the requests for object locations.

BRIEF DESCRIPTION OF THE DRAWINGS

These and other features, aspects, and advantages of the present invention will become better understood with reference to the following description, appended claims, and accompanying drawings wherein:

FIGS. 2a–b show examples of data formats for two tables that can be maintained by the load monitor depicted in FIGS. a–b;

DETAILED DESCRIPTION

Figure 1A:
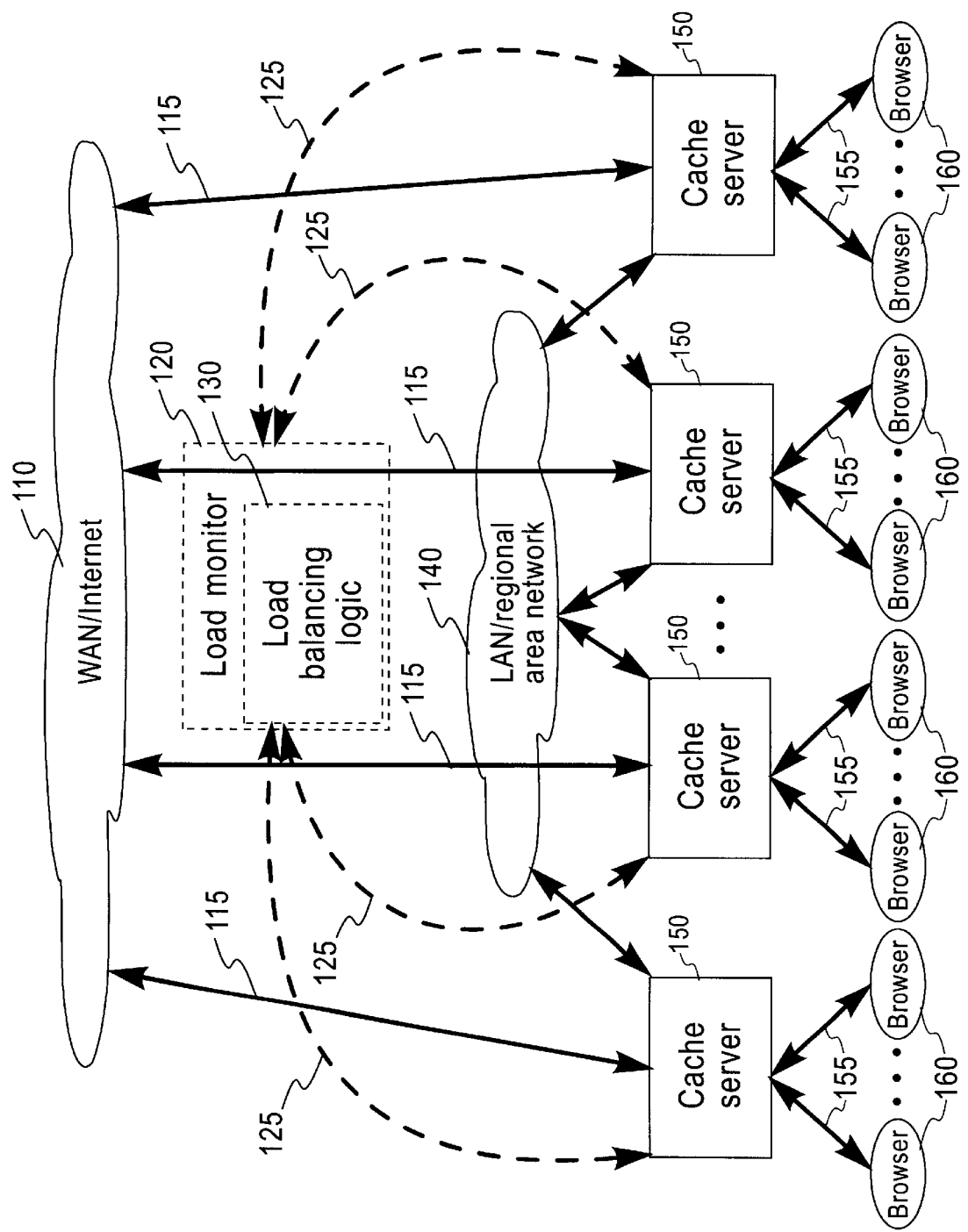
FIG. 1a shows an example of a system in a block diagram form employing a collection of proxy cache servers, wherein a centralized load balancing logic according to the present invention can be applied.

Examples of the load balancing logic of the present invention will be described for both centralized and distributed. architectures. FIG. 1 a shows an example of a block diagram of a system employing a collection of proxy cache servers, where a centralized load balancing logic proposed in this invention can be applied. As depicted, the system includes a collection of proxy cache servers 150. Although only a single level of cache server is depicted, there could be a hierarchy of cache servers 150. As is conventional, these proxy cache servers are connected with each other through a local area network (LAN) or a regional area network or intranet 140. Each cache server 150 is also connected to a wide area network (WAN) or the Internet 110. Through the WAN, these proxy cache servers can reach 115 the originating web servers for objects that cannot be found locally on their own caches.

According to the present invention a logical load monitor 120 includes a load balancing logic 130 for monitoring the load conditions and forwarding frequency (FIG. 2a) of the cooperating cache servers 150 and provides load balancing for them. As will be described below, various load monitor 120 features can: reside in one or more of the cache servers; be duplicated and distributed among the cache servers; or reside in another dedicated system such as a personal computer (PC) server or workstation. In a centralized system configuration, the load monitor 120 can perform a central directory function in directing forwarded requests 125 to the cache servers. One or more browsers 160 can be configured to connect to each cache server 150. Direct requests 155 are sent from the clients such as computers running conventional browsers 160 to the configured cache server 150. If the requested object can be found locally, then it is returned to the browser. Otherwise, the cache server 150 communicates a message to the load monitor 120. Various example implementations of the load monitor 120 will be described in more detail below. If no load imbalance condition or trend exits, the load monitor 120 then forwards the request 125 to the cache server 150 that owns the requested object. The owning cache server then sends the requested object to the requesting cache server, e.g., via the LAN 140.

If an actual load imbalance is identified, or predicted based on a loading trend, the load monitor 120 initiates a shifting of forwarded requests from the overloaded cache server to one or more underloaded (or less loaded) servers. As will be described in more detail below, the shifting of ownership can be based on the load condition of the servers 150 and the forwarding frequency, as well as other factors.

FIGS. 2a–b shows examples of data formats of two tables maintained by the load monitor. As depicted, the tables include a load table 102, and a caching table 101. One skilled in the art will appreciate that a single table, or various other data structures could alternatively or equivalently be used. The load table 102 includes the load condition 1021 of each (A,B,C . . . 1022) cache server 150 so that overloaded and underloaded servers can be identified:. As is conventional, load conditions 1021 can be updated periodically by probing each cache server. The load of a cache server can be a weighted sum of the number of forwarded requests and the number of direct requests. An overloaded cache server 150 can be identified by any conventional techniques, e.g., the load monitor can compute the mean load of all proxy cache servers in past intervals. Overloaded cache servers can be those with loads exceeding a threshold above the mean load. According to the present invention, load balancing takes into account the amount of overloading as well as the load due to the forwarding frequency 1011 of the cached objects. This way, the load monitor can decide whether or not to continue shifting some or all forwarded requests from an overloaded cache server C 10213 to an underloaded server A 10211. The caching table 1010 includes the forwarding frequency 1011 and ownership 1012 information of an object or a partition of objects. As will be discussed below, the ownership can be single as in A 10122, or shared 10121, 10123 among two or more cooperating cache servers. The forwarding frequency 1011 represents the number of times a request for an object has been forwarded through the load monitor. In addition to the forwarding frequency 1011, the caching table 101 can also maintain a timestamp 1013, indicating the most recent time a request for an object was forwarded. Further, the caching information for an object or a partition 1010 can include a forwarding frequency over a given time period (count/time) for the object ID or partition ID 1010 through the load monitor 120. Object partitions 1010 can alternatively be based on a hash function on object identifiers, or can be based on the directory structures that objects are organized by on the web servers. In the case of a partition, any object belonging to a partition will be forwarded by the load monitor. The shifting of ownership can be based on the load condition of the servers, the forwarding frequency 1011 and other information such as the time stamp information.

Figure 3:
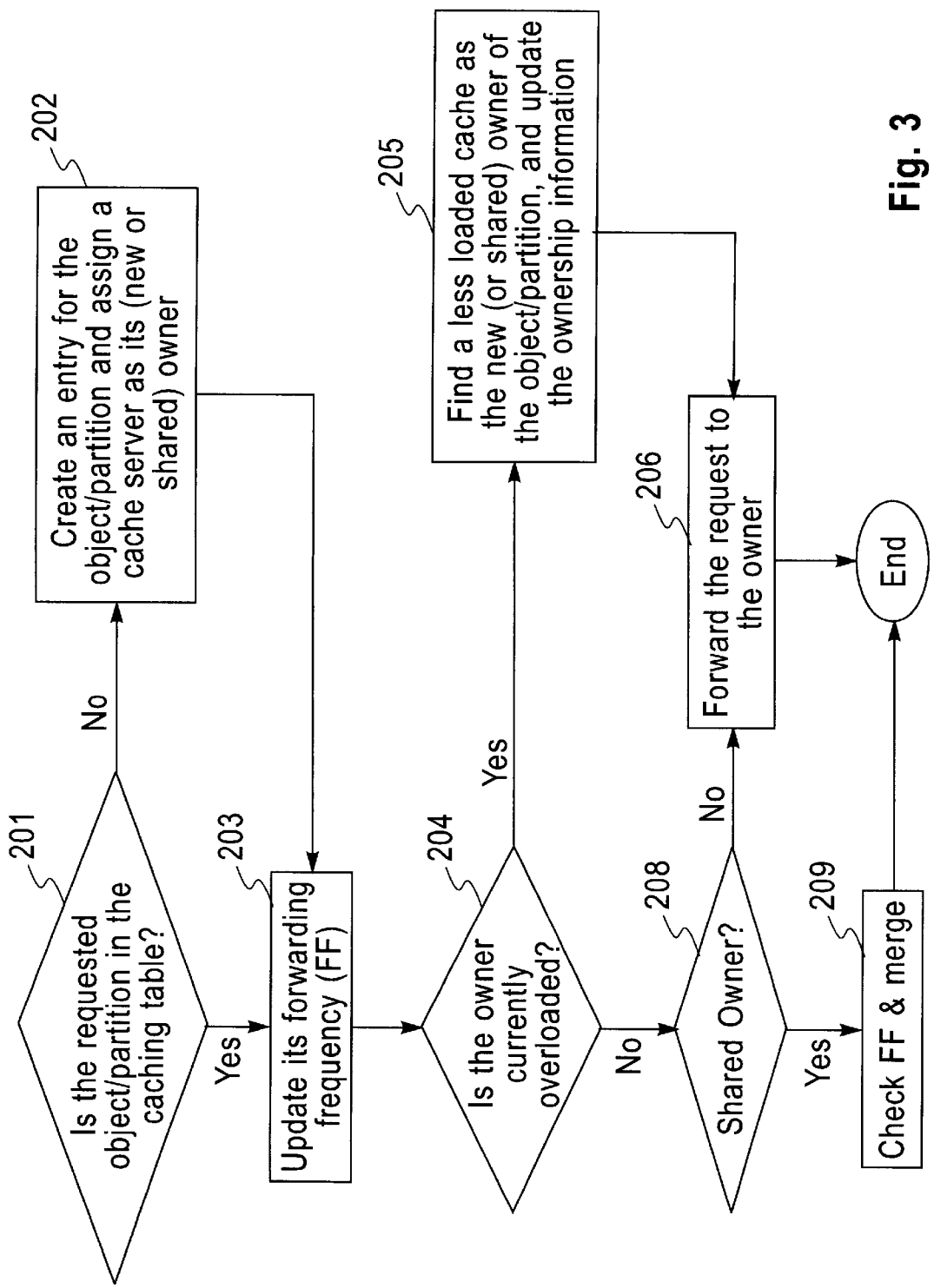
FIG. 3 shows an example of a logic flow for the load monitor in response to a request from a cache server because of a cache miss.

FIG. 3 shows an example of a logic flow for steps taken by the load monitor 120 in response to a request 125 from a cache server 150 because of a cache miss. As depicted, in step 201, it checks to see if the requested object/partition can be found in the caching table. If not, in step,202, a new entry is created for the object/partition and a cache server is assigned as its owner. After the entry is located in the caching table, in step 203, the forwarding frequency 1011 is updated, e.g., incremented by 1. The load monitor then examines the load table 102 to see if the owner is currently overloaded (and that the forwarding frequency 1011 is a significant contributor thereto), in step 204. If yes, in step 205, the load monitor finds an underloaded (or less loaded) cache server and assign it as the new 10122 (or shared) owner 10122 of the requested object. The ownership information 1012 for the object in the caching table 101 is updated accordingly. Those skilled in the art will appreciate that the logic flow could comprise a shared 10123 or hierarchical ownership 1012 in the caching table 101 or other data structure employed. The request (possibly with a copy of the requested object) can then be forwarded 125 to a new sole 10122 (or shared 10123) owner, in step 206. Alternatively, the new owner can be requested to obtain 115 an object copy from the originating object server, e.g., via the Internet 110. Those skilled in the art will appreciate that the load checking step 204 can be performed proactively, i.e., periodically or in response to an identified overload or overload trend 1021 due at least in part to a high forwarding frequency 1011—for a given object id/partition id 1010 and cache server (ownership 1012). If so, then in step 205, the load monitor finds an underloaded (or less loaded) cache server, assigns it as the new (or shared) owner of the requested object, and possibly sends a copy of the object to the new (or shared) owner as above. Conversely, if a shared ownership model is used, in step 208, when the load condition 10211 and forwarding frequency 10111 for a shared ownership object (p 10101) drops below a predetermined threshold, in step 209, the shared ownership (B, A 10121) can be merged to a single ownership and one of the copies purged from one of the cache servers A 10121, e.g., to make room for another hot object.

Figure 4:
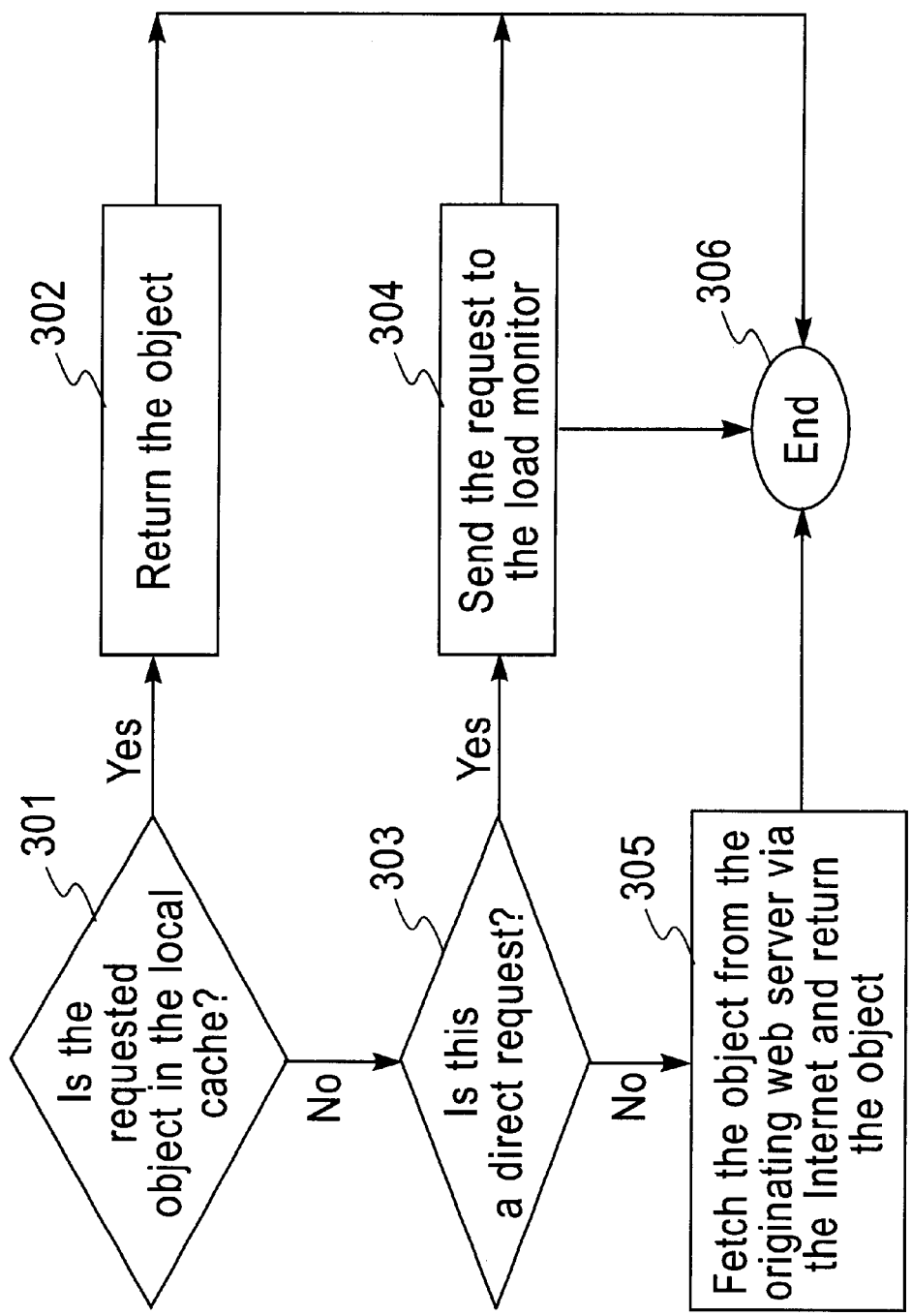
FIG. 4 shows an example of a logic flow for a cache server in response to a request for an object.

FIG. 4 shows an example of a logic flow for a cache server when a request for an object is received, either directly 155 from a browser 160 or forwarded 125 from the load monitor 120. As depicted, in step 301, it first checks to see if the requested object can be found locally in its cache. If yes, in step 302, it returns the object and the process ends, in step 306. Otherwise, in step 303, it checks to see if the request is a direct request or a forwarded request. If it is a direct request, in step 304, the request is sent to the load monitor and the process ends, in step 306. On the other hand, if the request is a forwarded request, in step 305, the cache server will fetch the object from the originating web server and return the object. The process then ends, in step 306.

Referring now to FIGS. 1*a* and 2*a*–*b*, assume for example, a browser 160 connecting to a cache server C 10223 requests 155 an object p 10101. From the caching table 101, it can be seen that object p 10101 is not cached on server C, but it is cached on ("owned" by) cache server B (assuming B, A 10121 is initially only solely designated by B). In response to a cache miss on object p, server C 10223 sends a request to the load monitor 120 for object p. Depending on the load condition 10212 and forwarding frequency 1011 of requests for p 10101 on server B, the load monitor may forward the request to server B, asking it to send a copy of object p to server C. Or, if server B is currently overloaded or is trending as such, the load monitor might shift the forwarded request by finding an underloaded (or less loaded) server to serve as a new (or shared as in B, A 10121) owner of object p. The request is then forwarded to the new (or shared e.g., A) owning server for the object. Note that even after the transfer of ownership, a copy of object p is still on server B's cache and can still serve direct requests coming to server B. However, in this example, all future forwarded requests for object p (or perhaps some, in the case of a shared ownership) will be shifted to server A. Alternatively, in the case of shared ownership B, A 10121, future forwarded requests for object p 10101 can be sent to the less loaded server.

Now that a load balancing method according to the present invention has been described for a collection of proxy cache servers where a logical central directory is used for locating an object, various alternatives will be considered. The present invention can be adapted to achieve load balancing for these systems as well.

For example, the present invention can be configured to perform load balancing for a collection of cooperating proxy cache servers where each cache server 150 multicasts to a list of cooperating cache servers to locate a copy of a locally missed object. In this case, no specific ownership information need be maintained anywhere in the system. However, there is also no guarantee of finding an object from the cooperating cache servers, either. Assume that a logical load monitor 120 is used to maintain the load conditions 1021 of all proxy cache servers and share this information with each cache server 150. The load balancing can be achieved by excluding overloaded servers from the list of cooperating servers to which a cache server multicasts its request (also called a shift request). As a result, only less loaded cache servers will receive forwarded requests 125.

Another alternative is a load balancing method for a collection of cooperating proxy cache servers where a hash function is used to locate a copy of a locally missed object. In this case, the object space can be partitioned among the cooperating proxy cache servers 150, with one partition for each cache server. In order to achieve load balancing by shifting forwarded requests, one can change the hash function so that forwarded requests will not go to overloaded servers. One preferred approach is to hash the object space into a large number of buckets, much larger than the total number of proxy cache servers. These hash buckets are then assigned to the cache servers, with the goal of balancing the loads among them. Periodically, one can move one or more hash buckets from one overloaded server to an underloaded server, effectively changing the hash function.

In either case, the load condition of the cooperating cache server can factor in the forwarding frequency directly into the calculated load condition. For example, the load condition can be a weighted sum of a count of said forwarded requests, and a count of direct requests to said cooperating cache server. Alternatively, the load monitor could separately maintain the overal forwarding frequency for each cooperating cache server.

Figure 1B:
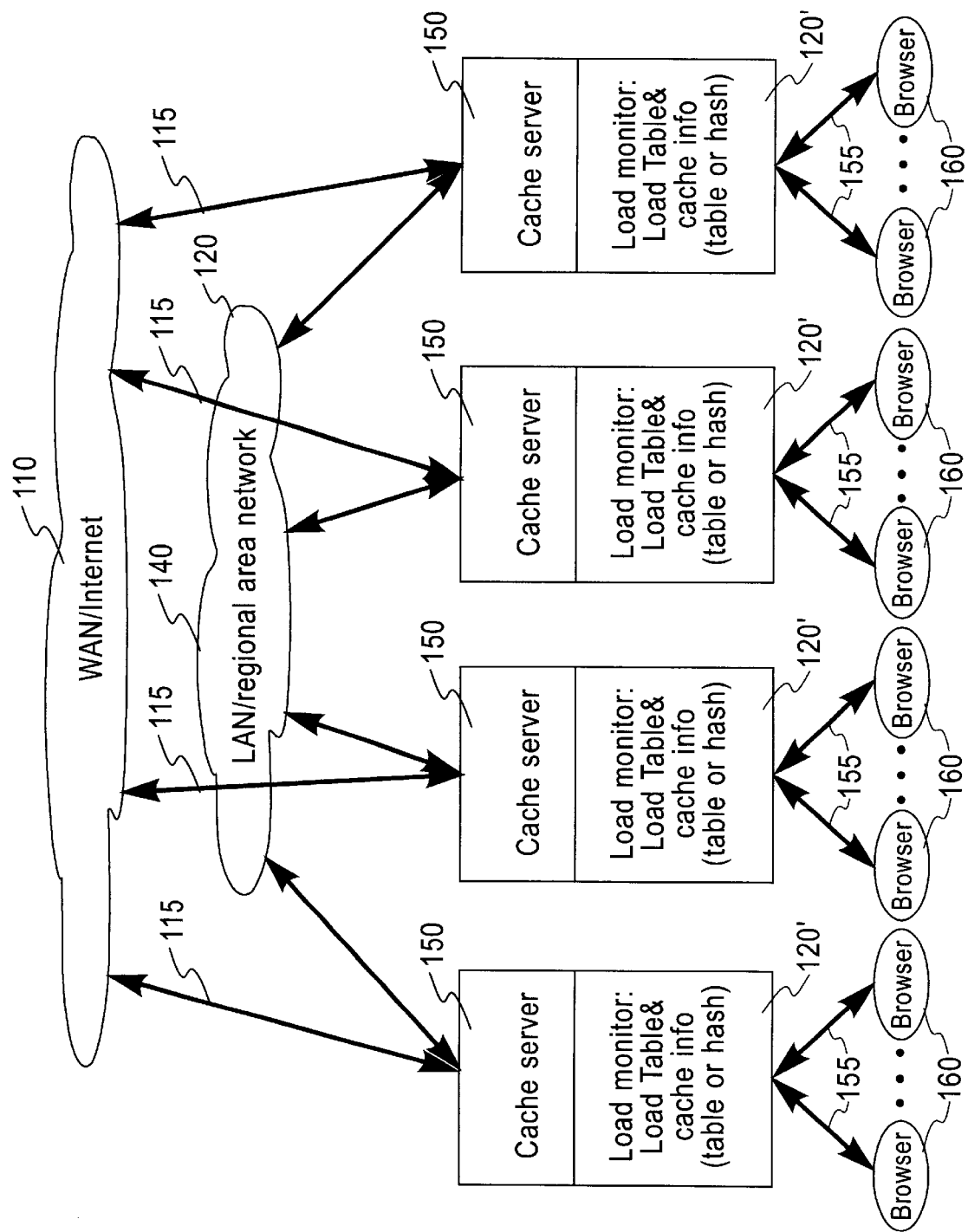
FIG. 1b shows another example of a system in a block diagram form employing a collection of proxy cache servers, where a distributed load balancing logic according to the present invention can be applied.

Referring now to FIGS. 1*b* and 2*a*–*b*, yet another alternative is a load monitor 120 that is distributed, i.e., wherein some or all the load monitor is duplicated across the cache servers 150. In one example, the distributed load monitor includes local load condition information 1021 (and as described below, possibly the load conditions of all (A, B, C, ... 1022)) of the cooperating cache servers 150. The distributed load monitor 120' preferably also includes the caching table 101 with the forwarding frequency 1011 and ownership 1012 information for each object id/partition id 1010. Alternatively, a hashing function, for example as described above, could be distributed and stored in the cache servers. Load condition information 1021 and/or caching information 101: can be exchanged periodically; when there is a change in status (ownership or significant change in load condition); or piggybacked with cache forwarding requests and, responses. Load condition 1021 information could also have a time stamp (not shown) associated with it for tracking or other purposes.

Here, if a cache server 150 has a cache miss, the local load monitor 120' looks up the ownership of the requested object in its local caching table 101 and forwards the request, to the owning cache server. Alternatively, the hash function could be applied to a key from the request, such as the URL or the destination IP address, to identify the partition and the request then forwarded to the correct cache server. When the forwarded request (i.e., from a cache server who had a cache miss) is received, the owning cache server identifies it as a forwarded request (e.g., by identifying it as from another cache server as opposed to a client) and updates its forwarding frequency 1011 information as applicable (FIG. 3, step 203). If an overload trend or condition is indicated (step 204), the owning cache server can respond to the requesting cache server with a shift request and a copy of the cached object. Alternatively, the requesting cache server can obtain a copy from the originating object server via an intranet, WAN or Internet 110. In either case, when the forwarding server caches a copy of the object, this server will no longer issue forward requests (steps 301, 302) as long as it remains in the cache, thus proportionally reducing the load on the owning server. In addition, the owning cache server can multicast a shift request message to one or more of the other cooperating cache servers 150 so that subsequent forward requests will be shifted, e.g., by updating their local copy of the caching table or modifying the hash function (step 205). At this point, other cache servers can forward their requests to the new owner (or to the least loaded owner of two or more cache servers 150 if ownership is shared) as indicated in their local copy of the caching table 101. When the original cache owner's load has decreased to an acceptable level (step 204), e.g., as indicated by a threshold, the shared ownership information can be merged to its original state (e.g., B,A 10121→B).

In the case that the load condition information 1021 for all cache servers (A,B,C . . . 1022) is fully distributed, the requesting cache server could proactively check the load condition (and associated time stamp) of the owning server (step 204), i.e., before forwarding the request. If overloaded, the requesting server could request a copy of the object from the owning server (or from the originating server via the intranet or Internet 110) and possibly a load condition confirmation. The owning cache server could update its caching table 101 or modify the hash function to indicate the new shared ownership (step 205). The requesting server (or the owning server) could then multicast a message to all other cache servers 150 indicating the new shared ownership of the object and possibly include an updated load condition. At this point, other cache servers would update their caching tables 101 or modify the hash function to indicate the new shared ownership (step 202), and can forward their requests (step 206) to the least loaded owner of two or more cache servers 150 sharing ownership as indicated in their local copy of the caching table 101. When a shared cache owner's load has decreased to an acceptable level (steps 204 and 208), e.g., as indicated by a threshold, the ownership information can be merged to its original state, in step 209.

A preferred embodiment of the present invention includes features that can be implemented as software tangibly embodied on a computer program product or program storage device for execution on a processor (not shown) provided with cache server 150 or other computer embodying the load monitor 120, such as in the centralized model described. For example, software implemented in a popular object-oriented computer executable code such as JAVA provides portability across different platforms. Those skilled in the art will appreciate that many other compiled or interpreted, procedure-oriented and/or object-oriented (OO) programming environments, including but not limited to REXX, C, C++ and Smalltalk can also be employed.

Those skilled in the art will also appreciate that methods of the present invention may be the software may be embodied on a magnetic, electrical, optical, or other persistent program and/or data storage device, including but not limited to: magnetic disks, Direct Access Storage Devices (DASD), bubble memory; tape; optical disk formats such as CD-ROMs and DVD; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the server 120' could be accessed and maintained directly via disk (not shown), the network, another server, or could be distributed across a plurality of servers.

While we have described our preferred embodiments of our invention with alternatives, it will be understood that those skilled in the art, both now and in the future, may make various improvements and enhancements which fall within the scope of the claims which follow. These claims should be construed to maintain the proper protection for the invention first disclosed.

We claim:

1. A cache server load balancing system, comprising:
   means for receiving forwarded requests which have been forwarded from one of a plurality of cooperating cache servers in response to a cache miss for an object on the cooperating cache server; and
   shifting means for shifting one or more of said forwarded requests for the object between cooperating cache servers based on dynamically maintained server load conditions and forwarding frequency, said forwarding frequency comprising the number of times requests for the object have been forwarded.

2. The system of claim 1, said shifting means further comprising:
   means for periodically monitoring the load condition on and the forwarding frequency to said cooperating cache servers; and
   means for proactively shifting one or more subsequent forwarded requests for the cached object from between said cooperating cache servers, in response to said monitoring.

3. The system of claim 1, said shifting means further comprising means for checking the load condition and forwarding frequency, in response to the forwarded request.

4. The system of claim 1, wherein said shifting means comprises means for modifying an ownership for the object to a shared ownership between two or more of said cooperating cache servers.

5. The system of claim 4, further comprising merging said shared ownership in response to a change in the load condition.

6. The system of claim 1, further comprising means for locally monitoring the load condition on each cooperating cache server.

7. The system of claim 6, further comprising:
   distributed load monitor means for maintaining a local load condition, the forwarding frequency and ownership information for cached objects on said each cooperating cache server.

8. The system of claim 7, further comprising:
   means for said cooperating cache servers to periodically exchange and maintain one or more of: the load condition information; the forwarding frequency; and the ownership information.

9. The system of claim 7, further comprising the steps of:
   means for said cooperating cache servers to piggyback one or more of: the load condition information; the forwarding frequency; and the ownership information; with one or more of the forwarded requests and responses.

10. The system of claim 7, further comprising:
    means for identifying a less loaded cooperating cache server; and means for communicating one or more of: a shift request; and a copy of the cached object, to said less loaded cooperating cache server.

11. The system of claim 10, further comprising:
said less loaded cooperating cache server including means for receiving said shift request; and
said less loaded cooperating cache server including means for requesting a copy of the object from an originating object server, in response to said shift request.

12. The system of claim 10, wherein the copy is obtained via one or more of an intranet, WAN or Internet.

13. The system of claim 7, further comprising:
a local copy of a caching table on said each cooperating cache server; and
means for said cooperating cache servers to maintain the forwarding frequency and the ownership information based on the local copy of the caching table.

14. The system of claim 7, further comprising:
hash function means for hashing the object space into a number of hash buckets much larger than a total number of said cache servers and assigning said hash buckets to said each cooperating cache server for locating a copy of a locally missed object; and
said shifting means comprising means for moving one or more hash buckets from an overloaded server to a less loaded server, effectively changing the hash function so that forwarded requests will not go to said overloaded server.

15. The system of claim 14, further comprising:
means for modifying the ownership for the object to a shared ownership between at least two of said cooperating cache servers; and
means for said cooperating cache servers to forward subsequent object requests to one or more less loaded shared owners of the object.

16. The system of claim 15, further comprising:
means for detecting a decrease in the load condition for a shared object; and
means for merging the shared ownership, in response to the decrease in the load condition.

17. The system of claim 1, further comprising: means for updating the forwarding frequency, in response to a forwarded request.

18. The system of claim 1, further comprising:
multicasting means for multicasting a shift request message to one or more of the other cooperating cache servers so that subsequent forward requests will be shifted.

19. The system of claim 1, wherein said shifting means for shifting one or more of said forwarded requests comprises means for communicating a copy of the object from an owning cache server to one or more of said cooperating cache servers.

20. The system of claim 1, further comprising,
means for calculating the load condition of each cache server in past intervals;
means for computing a mean load of all cache servers in past intervals; and
means for finding the cache servers that exceed a threshold above said mean load.

21. The system of claim 1, wherein the load condition of said cooperating cache server comprises a weighted sum of a count of said forwarded requests, and a count of direct requests to said cooperating cache server.

22. The system of claim 1, wherein said object is disposed at an object level and wherein each object may further be one of a plurality of objects in a partition of objects, said partition having a partition level further comprising means for maintaining cache information at one or more of: the object level for each object; and the partition level of a partition of objects.

23. The system of claim 22, wherein said cache information of said object level or said partition level, comprises the forwarding frequency associated with the object.

24. The system of claim 1, further comprising:
centralized logical load monitor means for maintaining the forwarding frequency and the load condition for said cooperating cache servers.

25. The system of claim 1, wherein said cooperating cache servers comprise cooperating proxy cache servers.

26. The system of claim 21, further comprising:
a logical directory server means for locating objects and forwarding requests for locally missed objects;
means for maintaining a caching table and a load table, coupled to said directory server;
cache server means for interrogating said directory server for object locations in other cache servers for a locally missed object; and
directory server means for load balancing requests among said cache servers by manipulating said caching table, in response to requests for object locations.

27. The system of claim 1, further comprising:
multicasting means on each cache server for multicasting to a list of cooperating cache servers to locate a copy of a locally missed object;
said shifting means comprising means for excluding overloaded cache servers from a subset of neighboring cache servers for multicasting.

28. A cache server load balancing method, comprising the steps of:
receiving forwarded requests which have been forwarded from one of a plurality of cooperating cache servers in response to a cache miss for an object on the cooperating cache server; and
shifting one or more of said forwarded requests for the object between cooperating cache servers based on dynamically maintained server load conditions and forwarding frequency, said forwarding frequency comprising the number of times requests for the object have been forwarded.

29. The method of claim 28, said shifting step further comprising the steps of:
periodically monitoring the load condition on and the forwarding frequency to an owning cache server; and
proactively shifting one or more subsequent forwarded requests for the cached object from the owning cache server to one or more of said cooperating cache servers, in response to said monitoring.

30. The method of claim 28, said shifting step further comprising the step of checking the load condition and forwarding frequency, in response to the forwarded request.

31. The method of claim 28, wherein said shifting comprises the step of modifying an ownership for the object to a shared ownership between two or more of said cooperating cache servers.

32. The method of claim 31, further comprising the step of merging said shared ownership in response to change in the load condition.

33. The method of claim 28, further comprising the step of locally monitoring the load on each cooperating cache server.

34. The method of claim 33, further comprising the step of:
   a distributed load monitor monitoring and maintaining a local load condition, the forwarding frequency and ownership information for cached objects on said each cooperating cache server.

35. The method of claim 34, further comprising the steps of:
   said cooperating cache servers periodically exchanging and maintaining one or more of: the load condition information; the forwarding frequency; and the ownership information.

36. The method of claim 34, further comprising the steps of:
   said cooperating cache servers exchanging by piggybacking one or more of: the load condition information; the forwarding frequency; and the ownership information; with one or more of the forwarded requests and responses.

37. The method of claim 28, further comprising the step of: receiving a forwarded request and updating the forwarding frequency.

38. The method of claim 34, further comprising the steps of:
   identifying a less loaded cooperating cache server; and
   communicating one or more of: a shift request; and a copy of the cached object, to said less loaded cooperating cache server.

39. The method of claim 38, further comprising the steps of:
   said less loaded cooperating cache server receiving said shift request; and
   said less loaded cooperating cache server requesting a copy of the object from an originating object server, in response to said shift request.

40. The method of claim 38, wherein the copy is obtained via one or more of an intranet, WAN or Internet.

41. The method of claim 28, further comprising the step of multicasting a shift request message to one or more of the other cooperating cache servers so that subsequent forward requests will be shifted.

42. The method of claim 41, further comprising the step of:
   the cooperating cache servers maintaining one of a local copy of a caching table and modifying a hash function; and
   the cooperating cache servers modifying the ownership information by one of: updating a local copy of a caching table; and modifying a hash function.

43. The method of claim 42, further comprising the steps of:
   modifying the ownership for the object to a shared ownership between at least two of said cooperating cache servers; and
   said cooperating cache servers forwarding subsequent object requests to one or more less loaded shared owners of the object.

44. The method of claim 43, further comprising the steps of:
   detecting a decrease in the load condition for a shared object; and
   merging the shared ownership, in response to the decrease in the load condition.

45. The method of claim 28, wherein said shifting one or more of said forwarded requests comprises the steps of:
   communicating a copy of the object from an owning cache server to one or more of said cooperating cache servers; and
   said cooperating cache server receiving and caching the copy of the object.

46. The method of claim 28, further comprising the steps of,
   calculating the load condition of each cache server in past intervals;
   computing a mean load of all cache servers in past intervals; and
   finding the cache servers that exceed a threshold above said mean load.

47. The method of claim 28, wherein the load condition of said cooperating cache server can be a weighted sum of a count of said forwarded requests, and a count of direct requests to said cooperating cache server.

48. The method of claim 28, wherein said object is disposed at an object level and wherein each object may further be one of a plurality of objects in a partition of objects, said partition having a partition level further comprising the step of maintaining cache information at one or more of: the object level for each object; and the partition level of a partition of objects.

49. The method of claim 48, wherein said cache information of said object level or said partition level comprises the forwarding frequency associated with the object.

50. The method of claim 49, further comprising the step of:
   a distributed load monitor monitoring and locally maintaining load conditions, forwarding frequency and ownership information for cached objects on each cache server.

51. The method of claim 50, further comprising the steps of:
   said cooperating cache servers periodically exchanging one or more of the load condition, the forwarding frequency and the ownership information.

52. The method of claim 49, further comprising the steps of:
   said cooperating cache servers exchanging by piggybacking one or more of: the load condition; the forwarding frequency; and the ownership information; with one or more of the forwarded requests and responses.

53. In a collection of cooperating cache servers, where each cache server can receive direct requests and forwarded requests, and upon a cache miss, a request can be forwarded to an owning cache server caching said object, a load balancing method comprising the steps of,
   monitoring a dynamically maintained load condition and a forwarding frequency for said cooperating cache servers, said forwarding frequency comprising the number of times requests for the object have been forwarded; and
   shifting one or more forwarded requests, which have already been forwarded, from one cooperating cache server to a second cooperating cache server based on a change in the load condition and the forwarding frequency.

54. The method of claim 53, wherein said step of monitoring the load condition comprises the steps of,
   calculating the load condition of each cache server in past intervals;
   computing a mean load of all cache servers in past intervals; and finding those cache servers that exceed a threshold above said mean load.

55. The method of claim 53, wherein said shifting step can be performed in response to one or more of: said forwarded requests from said cooperating cache servers; and periodically monitoring the load condition and the forwarding frequency.

56. The method of claim 53, further comprising the step of a centralized logical load monitor maintaining the forwarding frequency and the load condition for the cooperating cache servers.

57. The method of claim 53, wherein the load condition of said cache server can be a weighted sum of: a count of forwarded requests; and a count of direct requests to said cache server.

58. The method of claim 53, further comprising the step of maintaining cache information at each object level or at a partition of objects level.

59. The method of claim 58, wherein said cache information of the object level or the partition level comprises the forwarding frequency of requests through said load monitor to said object.

60. The method of claim 53, wherein said cooperating cache servers comprise cooperating proxy cache servers.

61. The method of claim 53, further comprising the steps of:
 a logical directory server maintaining a caching table and a load table;
 said cache servers interrogating said directory server for object locations in other cache servers for a locally missed object; and
 said directory server load balancing requests among said cache servers by manipulating said caching table, in response to requests for object locations.

62. The method of claim 56, further comprising the steps of:
 each cache server multicasting to a list of cooperating cache servers to locate a copy of a locally missed object; and
 said shifting step comprising the step of excluding overloaded cache servers from a subset of neighboring cache servers for multicasting.

63. A program storage device readable by a machine, tangibly executable a program of instructions executable by the machine to perform method steps for cache server load balancing, said method steps comprising:
 receiving forwarded requests which have been forwarded from one of a plurality of cooperating cache servers in response to a cache miss for an object on the cooperating. cache server; and
 shifting one or more of said forwarded requests for the object between cooperating cache servers based on dynamically maintained server load conditions and forwarding frequency, said forwarding frequency comprising the number of times requests for the object have been forwarded.

64. The program storage device of claim 63, said shifting step further comprising the steps of:
 periodically monitoring the load condition on and the forwarding frequency to an owning cache server; and
 proactively shifting one or more subsequent forwarded requests for the cached object from the owning cache server to one or more of said cooperating cache servers, in response to said monitoring.

65. The program storage device of claim 63, said shifting step further comprising the step of checking the load condition and forwarding frequency, in response to the forwarded request.

66. The program storage device of claim 63, wherein said shifting comprises the step of modifying an ownership for the object to a shared ownership between two or more of said cooperating cache servers.

67. The program storage device of claim 66, further comprising the step of merging said shared ownership in response to change in the load condition.

68. The program storage device of claim 63, further comprising the step of locally monitoring the load on each cooperating cache server.

69. The program storage device of claim 68, further comprising the step of:
 a distributed load monitor monitoring and maintaining a local load condition, the forwarding frequency and ownership information for cached objects on said each cooperating cache server.

70. The program storage device of claim 69, further comprising the steps of:
 said cooperating cache servers periodically exchanging and maintaining one or more of: the load condition information; the forwarding frequency; and the ownership information.

71. The program storage device of claim 69, further comprising the steps of:
 said cooperating cache servers exchanging by piggybacking one or more of: the load condition information; the forwarding frequency; and the ownership information; with one or more of the forwarded requests and responses.

72. The program storage device of claim 69, further comprising the steps of:
 identifying a less loaded cooperating cache server; and
 communicating one or more of: a shift request; and a copy of the cached object, to said less loaded cooperating cache server.

73. The program storage device of claim 72, further comprising the steps of:
 said less loaded cooperating cache server receiving said shift request; and
 said less loaded cooperating cache server requesting a copy of the object from an originating object server, in response to said shift request.

74. The program storage device of claim 72, wherein the copy is obtained via one or more of an intranet, WAN or Internet.

75. The program storage device of claim 63, further comprising the step of: receiving a forwarded request and updating the forwarding frequency.

76. The program storage device of claim 75, further comprising the step of:
 multicasting a shift request message to one or more of the other cooperating cache servers so that subsequent forward requests will be shifted.

77. The program storage device of claim 76, further comprising the step of:
 the cooperating cache servers maintaining one of: a local copy of a caching table; and a hash function; and
 the cooperating cache servers modifying the ownership information by one of: updating the local copy of a caching table; and modifying a hash function.

78. The program storage device of claim 77, further comprising the steps of:
 modifying the ownership for the object to a shared ownership between at least two of said cooperating cache servers; and said cooperating cache servers forwarding subsequent object requests to one or more less loaded shared owners of the object.

79. The program storage device of claim 78, further comprising the steps of:
   detecting a decrease in the load condition for a shared object; and
   merging the shared ownership, in response to the decrease in the load condition.

80. The program storage device of claim 63, wherein said shifting one or more of said forwarded requests comprises the steps of:
   communicating a copy of the object from an owning cache server to one or more of said cooperating cache servers; and
   said cooperating cache server receiving and caching the copy of the object.

81. The program storage device of claim 63, further comprising the steps of,
   calculating the load condition of each cache server in past intervals;
   computing a mean load of all cache servers in past intervals; and
   finding the cache servers that exceed a threshold above said mean load.

82. The program storage device of claim 63, wherein the load condition of said cooperating cache server can be a weighted sum of a count of said forwarded requests, and a count of direct requests to said cooperating cache server.

83. The program storage device claim 63, wherein said object is disposed at an object level and wherein each object may further be one of a plurality of objects in a partition of objects, said partition having a partition level further comprising the step of maintaining cache information at one or more of: the object level for each object; and the partition level of a partition of objects.

84. The program storage device of claim 83, wherein said cache information of said object level or said partition level, comprises the forwarding frequency associated with the object.

85. The program storage device of claim 84, further comprising the step of:
   a distributed load monitor monitoring and locally maintaining load conditions, forwarding frequency and ownership information for cached objects on each cache server.

86. The program storage device of claim 85, further comprising the steps of:
   said cooperating cache servers periodically exchanging one or more of the load condition, the forwarding frequency and the ownership information.

87. The program storage device of claim 84, further comprising the steps of:
   said cooperating cache servers exchanging by piggybacking one or more of: the load condition; the forwarding frequency; and the ownership information; with one or more of the forwarded requests and responses.

88. A program storage device readable by a machine, tangibly embodying a program of instructions executable by the machine to perform method steps for cache server load balancing in a collection of cooperating cache servers, where each cache server can receive direct requests and forwarded requests, and upon a cache miss, a request can be forwarded to a cooperating cache server caching said object, said method steps comprising:
   monitoring a load condition and a forwarding frequency for said cooperating cache servers; and
   shifting one or more forwarded requests from one cooperating cache server to a second cooperating cache server based on a change in the load condition and the forwarding frequency.

89. The program storage device of claim 88, wherein said step of monitoring the load condition comprises the steps of,
   calculating the load condition of each cache server in past intervals;
   computing a mean load of all proxy cache servers in past intervals; and
   finding those proxy cache servers that exceed a threshold above said mean load.

90. The program storage device of claim 88, wherein said shifting step can be performed in response to one or more of: said forwarded requests from said cooperating cache servers; and
   periodically monitoring the load condition and the forwarding frequency.

91. The program storage device of claim 88, further comprising the step of a centralized logical load monitor maintaining the forwarding frequency and the load condition for the cooperating cache servers.

92. The program storage device of claim 91, further comprising the steps of:
   each cache server multicasting to a list of cooperating cache servers to locate a copy of a locally missed object; and
   said shifting step comprising the step of excluding overloaded cache servers from a subset of neighboring cache servers for multicasting.

93. The program storage device of claim 88, wherein the load condition of said cache server can be a weighted sum of: a count of forwarded requests; and a count of direct requests to said cache server.

94. The program storage device of claim 88, wherein said object is disposed at an object level and wherein each object may further be one of a plurality of objects in a partition of objects, said partition having a partition level further comprising the step of maintaining cache information at the object level for each object; and the partition level of a partition of objects.

95. The program storage device of claim 88, wherein said cache information of the object level or the partition level comprises the forwarding frequency of requests through said load monitor to said object.

96. The program storage device of claim 88, wherein said cooperating cache servers comprise cooperating proxy cache servers.

97. The program storage device of claim 88, further comprising the steps of:
   maintaining a caching table and a load table;
   receiving requests for object locations in other cache servers for a locally missed object; and
   load balancing requests among said cache servers by manipulating said caching table, in response to said requests for object locations.

* * * * *